U. ANDERSON.
GANG EDGER.
APPLICATION FILED JAN. 29, 1907.
941,751.
Patented Nov. 30, 1909.
7 SHEETS—SHEET 1.
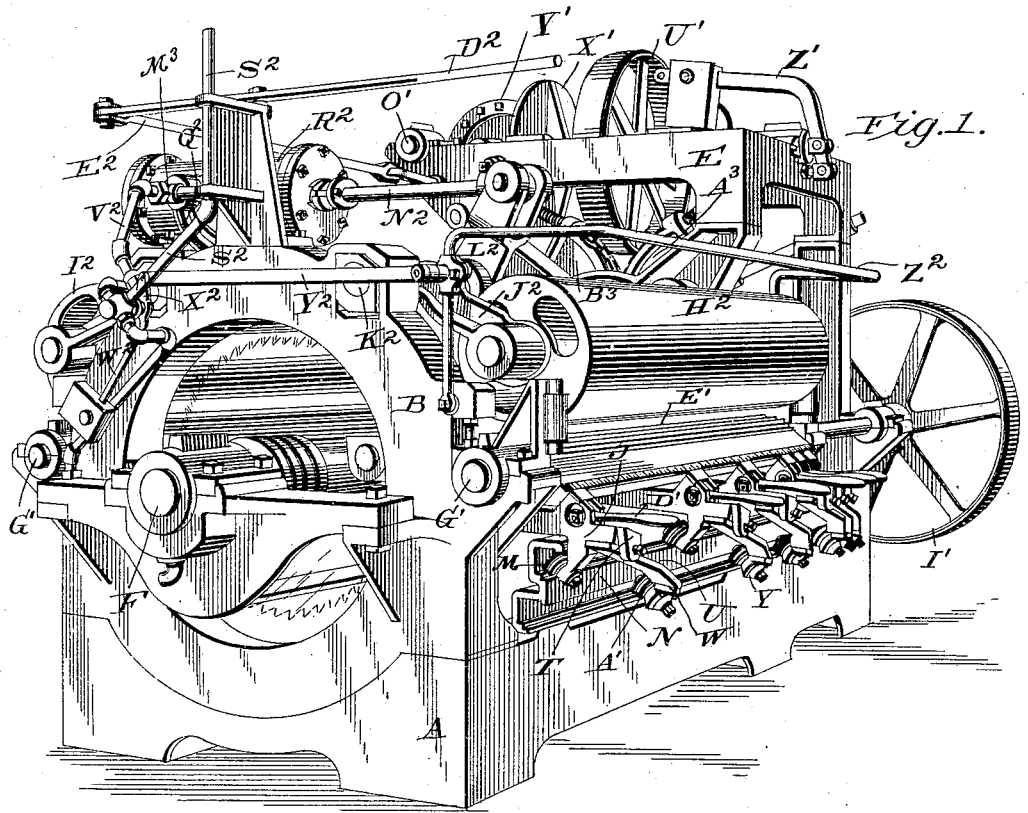
Fig. 1.
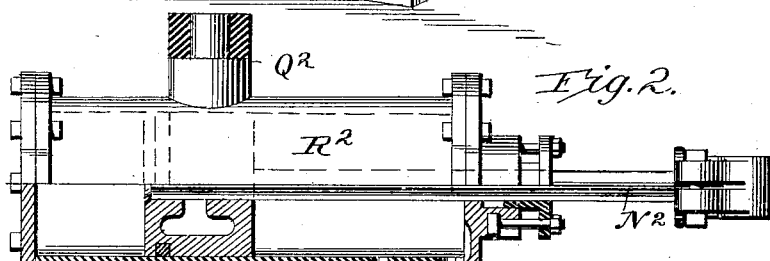
Fig. 2.
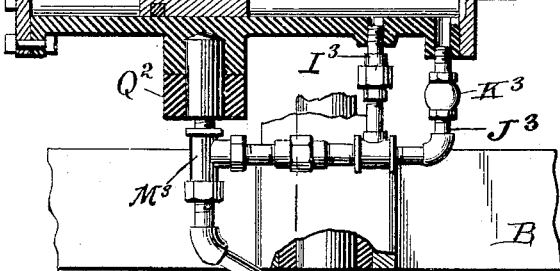
Fig. 3.
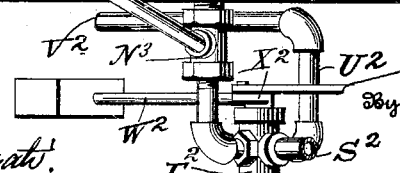
Witnesses
Inventor:
Ulrich Anderson,
By Dodge and Sons,
Attorneys.

U. ANDERSON.
GANG EDGER.
APPLICATION FILED JAN. 29, 1907.

941,751.

Patented Nov. 30, 1909.
7 SHEETS—SHEET 2.

Witnesses
Inventor:
Ulrich Anderson,
By Dodge and Sons,
Attorneys

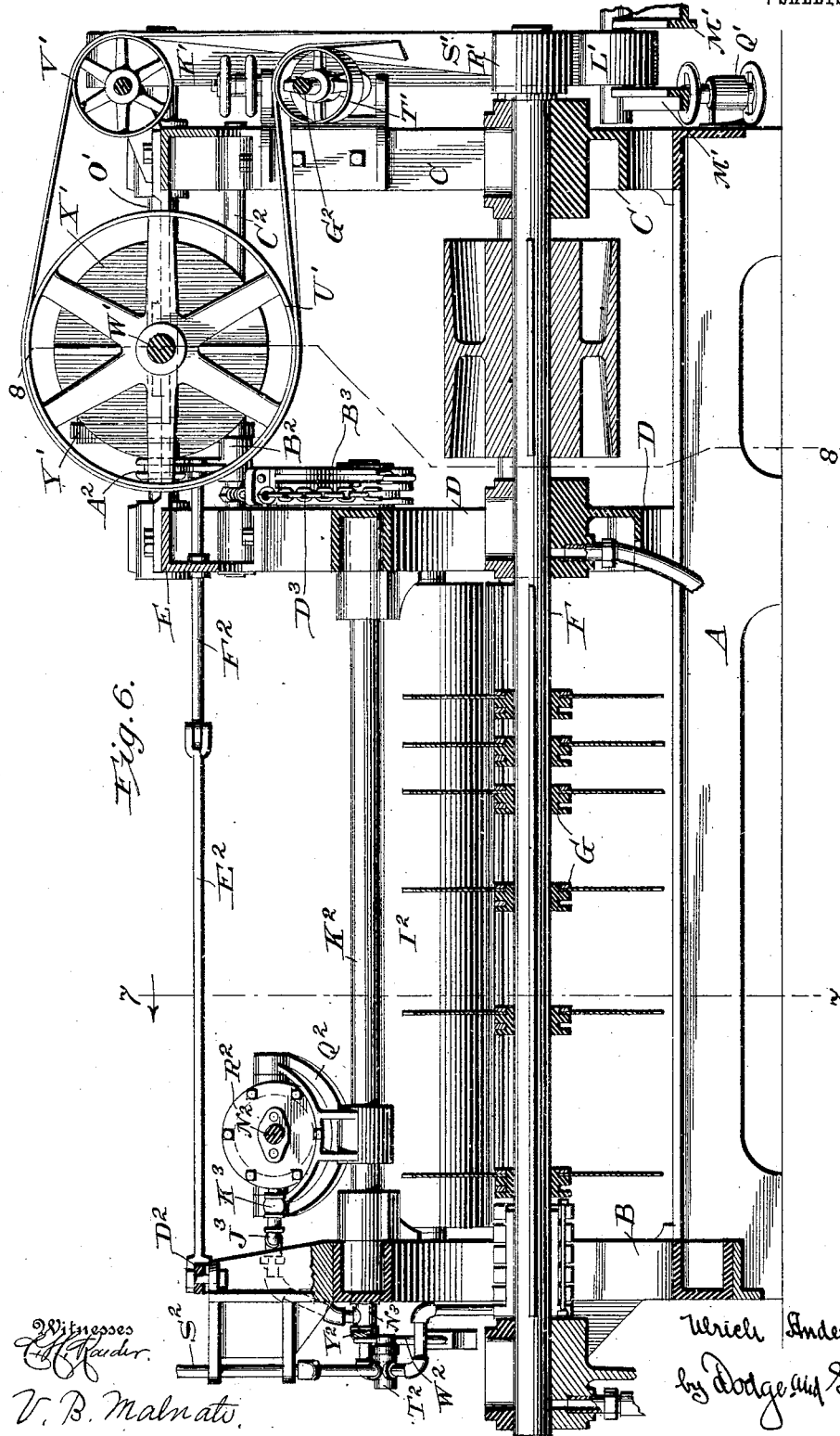

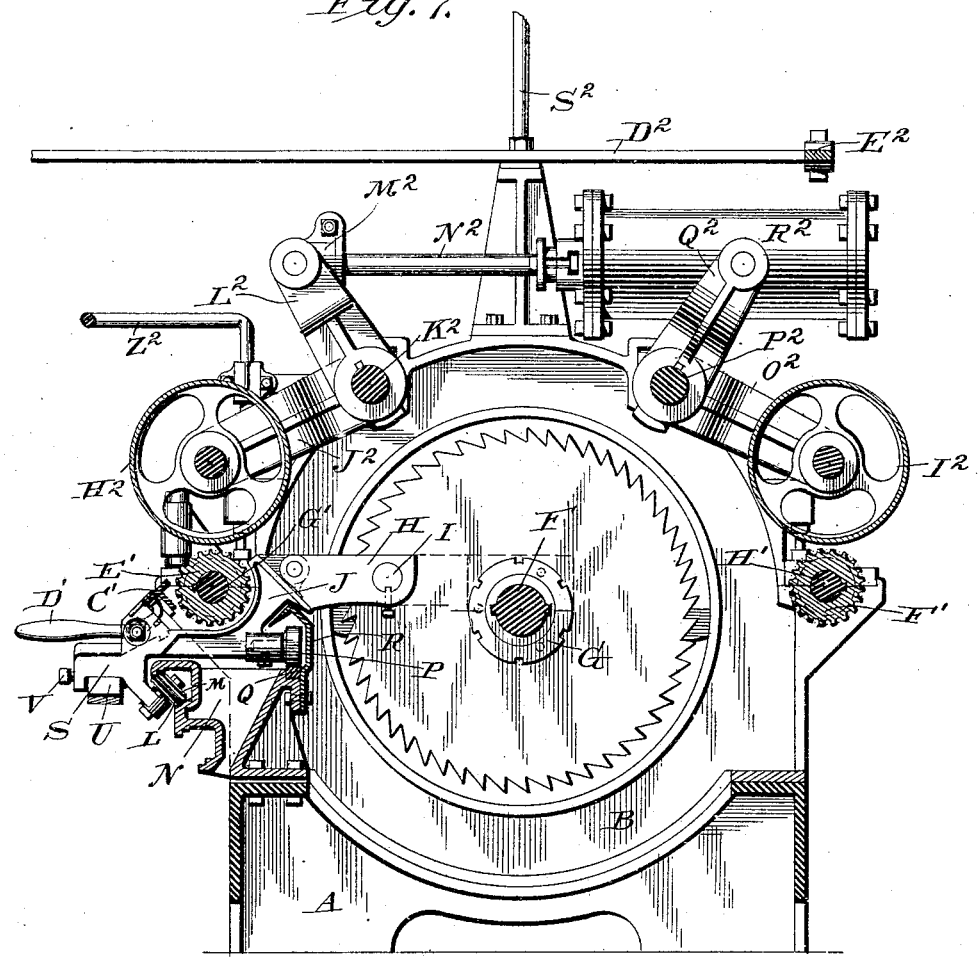

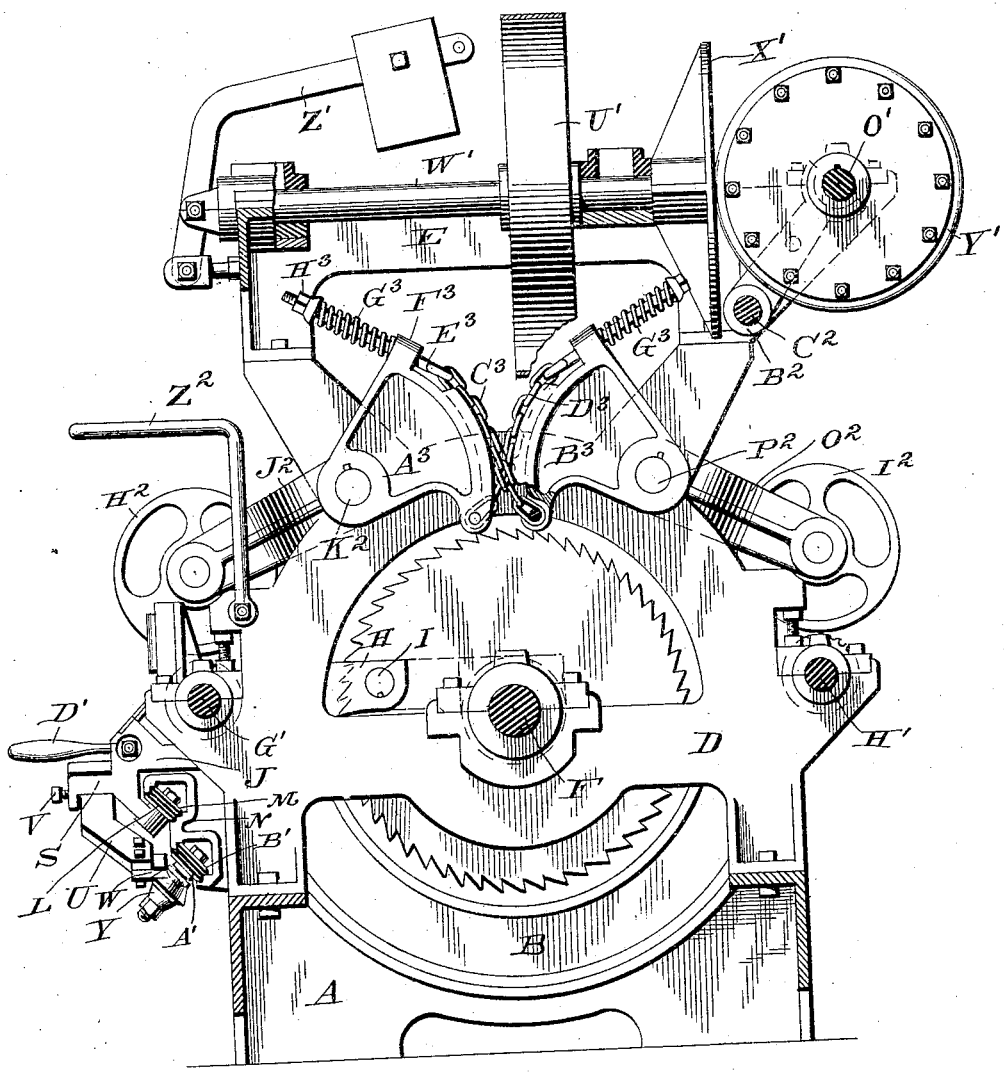

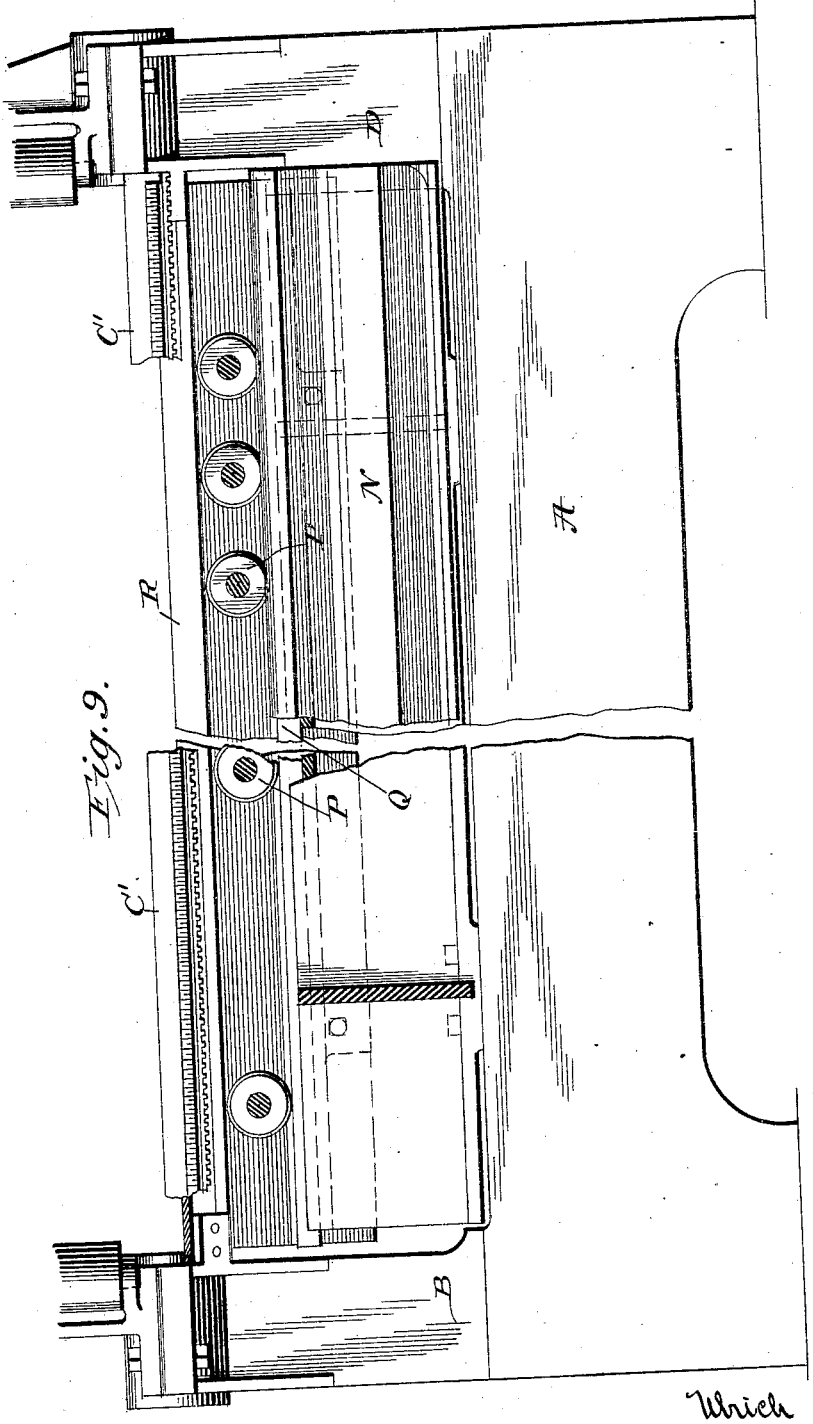

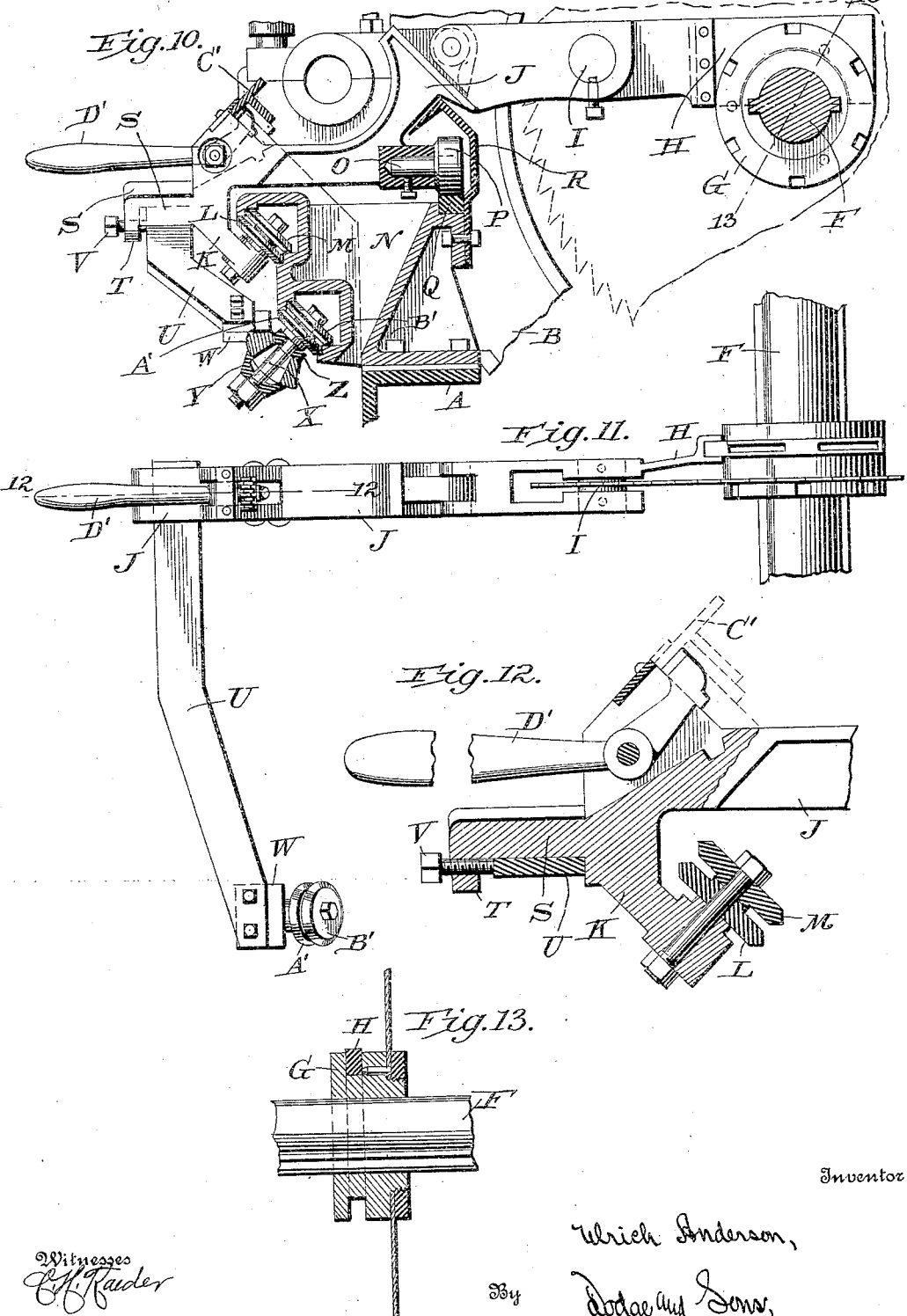

UNITED STATES PATENT OFFICE.

ULRICH ANDERSON, OF FOND DU LAC, WISCONSIN, ASSIGNOR TO GIDDINGS & LEWIS MANUFACTURING COMPANY, OF FOND DU LAC, WISCONSIN, A CORPORATION OF WISCONSIN.

GANG-EDGER.

941,751.      Specification of Letters Patent.      Patented Nov. 30, 1909.

Application filed January 29, 1907. Serial No. 354,762.

*To all whom it may concern:*

Be it known that I, ULRICH ANDERSON, a citizen of the United States, residing at Fond du Lac, in the county of Fond du Lac and State of Wisconsin, have invented certain new and useful Improvements in Gang-Edgers, of which the following is a specification.

Figure 4:
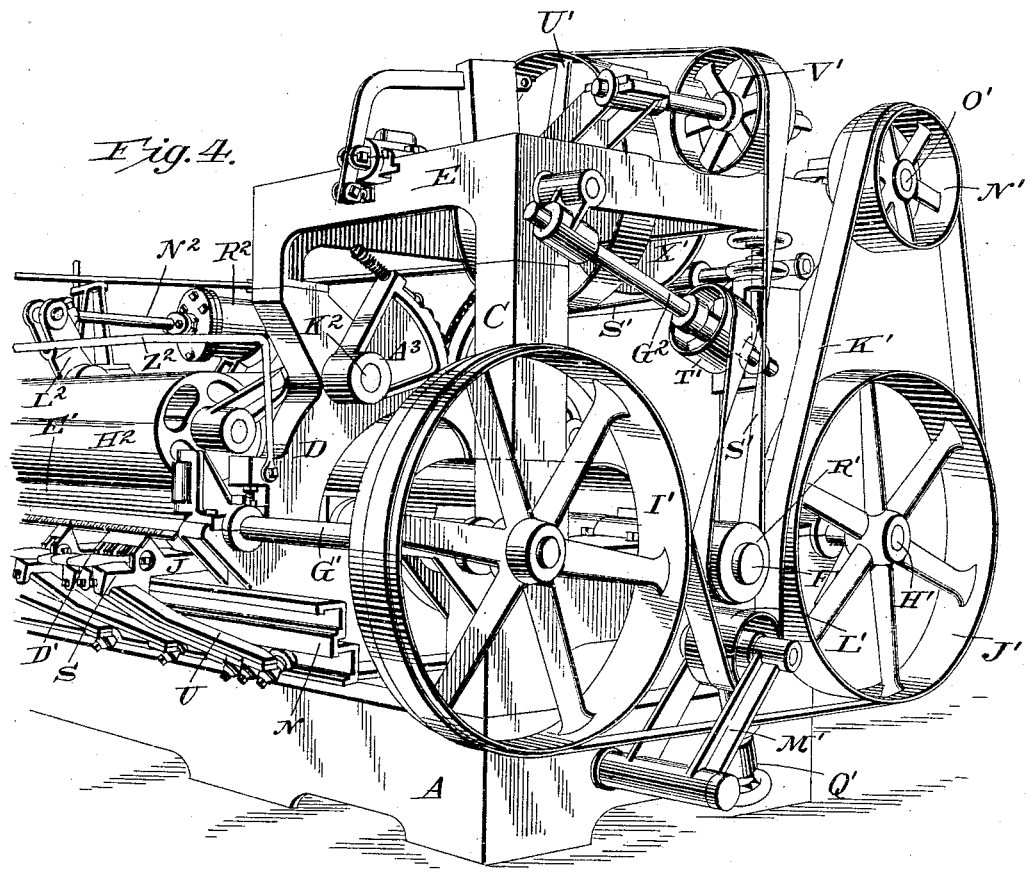
Figure 5:
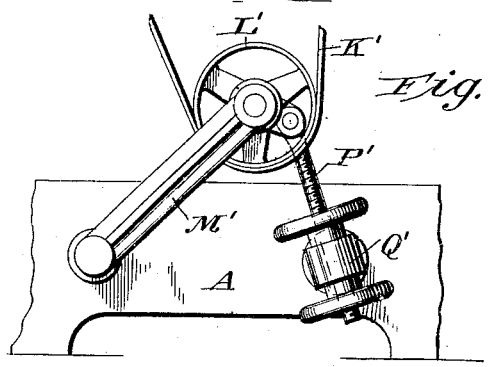

My invention pertains to improvements in gang edgers, the construction and advantages of which will be hereinafter set forth, reference being had to the annexed drawings, wherein:

Figure 1 is a perspective view of the machine as seen from the forward or feed side thereof; Fig. 2 is a detail view of the cylinder and its connections which are employed to operate the upper feed rolls; Fig. 3 a detail view of the check-valve used in conjunction with the cylinder; Fig. 4 a perspective view of one end of the machine, showing the belt employed for driving the lower feed rolls; Fig. 5 a detail view of the belt-tightener; Fig. 6 a longitudinal vertical sectional view of the machine; Fig. 7 a transverse vertical sectional view, taken on the line 7—7 of Fig. 6; Fig. 8 a similar view taken on the line 8—8 of Fig. 6; Fig. 9 a sectional elevation showing the frames and tracks for supporting the slides or shifters for the saws; Fig. 10 a side elevation of one of said shifters, the supporting tracks being shown in section; Fig. 11 a top plan view of one of the shifters; Fig. 12 an enlarged sectional view taken on the line 12—12 of Fig. 11; and Fig. 13 a detail sectional view of one of the saw-supporting hubs, taken on the line 13—13 of Fig. 10.

The main object of the invention is to provide a superior means for supporting the saw-slides or actuating members, whereby cramping of the parts is prevented, while they may be readily shifted from one to another position.

Another object of the invention is to provide the saw-actuating slides with a member which will engage the saw-hub or collar upon opposite sides of the arbor, whereby cramping of the hub or supporting member upon the arbor is prevented as the saw is shifted longitudinally of the arbor.

Referring to the drawings, A denotes the base or bed of the machine, surmounted at one end by a frame or casting B and at the opposite end by a frame or casting C, while a third casting or frame D is secured to the base A. Mounted upon the upper end of the frames C and D is a cross frame or table E, which serves as a support for a portion of the roll-driving mechanism hereinafter referred to in detail.

The saw-arbor F is mounted in suitable bearings carried by or formed in frames B, C and D, the arbor being provided with splines or feathers as is usual in machines of this class. A number of collars G are slidably mounted upon said arbor, each collar being provided with an annular groove or recess formed in its periphery for the reception of the outer end of an arm H, as shown in Figs. 10 and 11. As will be noted upon reference to Fig. 10, the end of the arm is provided with a semicircular seat or recess so that it engages a collar upon the opposite sides of the shaft, and when shifted laterally causes said collar to move longitudinally of the shaft without any binding or cramping action. By preference the outer end of arm H will be made separate from the main body thereof, so that a new portion may be substituted when the arm becomes worn by reason of friction with the collar. The arm H likewise carries bearing-blocks I, which take against the face of the saw and serve to steady the same. Said arm H is pivotally connected to the inner end of a frame or slide J, the slide being provided with a downwardly-projecting arm K which forms the support for a stub-axle upon which is mounted a pair of rolls L and M, having Λ-shaped edges. The lower edge of roll L is seated and bears in a grooved track or runway formed in a casting or bracket N secured to the frame of the machine, the upper edge of the roll bearing against a flat face formed upon the overhanging portion of the bracket N. The uppermost roll M bears at its upper edge in a grooved runway or channel, while its lower edge rests upon a flat face, best shown in Fig. 10. A stub-axle O is secured in a socket or recess formed in the slide, a roller P being mounted upon the outer end of said axle and bearing upon a track Q, mounted upon the upper face of the bracket or casting N. An overhanging guard or shield R is provided for the roller P and its track.

Slide J is provided with an outwardly-extending arm S having a depending lug T formed integral therewith. A guide arm U, of the form best shown in Fig. 11, is secured to the slide J beneath the arm S by a set-screw V. The arm is angled, as shown, in order that the various arms of the slides may nest properly, as best shown in Fig. 4 when the slides are moved close together in order to bring the saws into such relation.

To the outer lower end of the arm U is secured a bracket W of the form best shown in Fig. 10. Said bracket is provided with a centrally-disposed opening and with an upper concave and a lower convex face. A bolt X is passed through the opening and a washer Y bears upon the lower convex face, while a washer Z rests against the upper or concave face. A pair of rolls A', B' is mounted upon the upper end of the bolt X. The rolls run in tracks or ways formed in the bracket N, in the manner best shown in Fig. 10.

A rack or locking bar C' is secured to the frame of the machine, and a lever D' is fulcrumed upon the outer portion of the slide J, said lever being provided at its inner end with a series of teeth which, when the slide is brought to its desired position, will pass into engagement with the rack-bar and thus hold the slide in its adjusted position, and as a consequence hold the arm H and the saw-collar, which it engages, in their desired positions.

It has been found that by the employment of rolls in the manner above set forth the slide may be readily moved along the supporting frame or bracket without any cramping action whatever. It will also be noticed that the tracks or guideways are so formed as to preclude the entrance of any sawdust or chips.

By employing Λ-shaped rollers and making one set adjustable, the parts may be brought properly to their seats and lost motion thereby prevented. The rollers, however, notwithstanding the close fit of the parts, will permit the ready movement of the slide J along the supporting frame or bracket.

As will be seen upon reference to Fig. 10, the rollers L, M and A', B' are so disposed as to prevent the lifting of the slide J when the levers D' are moved upward in the act of unlocking the slides. Furthermore, when the lever is turned downward, in the act of locking the slide in its adjusted position, the rollers also serve to prevent the canting or tipping of the slide and the possible disengagement of the arm H from the saw-collar.

The lower positively-driven feed rolls are designated by E' and F', the former being mounted upon and rotating with a shaft G', and the latter secured to and rotating with shaft H'. These shafts find their bearings in the frame D, a large band-wheel I' being mounted upon the outer end of shaft G' and band-wheel J' upon the outer end of shaft H'. An endless belt K' passes around the band-wheels, beneath a pulley L' carried upon the upper end of a bracket M' which latter is pivotally secured to the bed of the machine. The belt also passes around a band-wheel N', mounted upon a shaft O' (Figs. 4, 6 and 8). Proper tension for the belt is secured by adjusting the bracket M', such adjustment being effected through adjustment of a rod P' which is connected to the outer end of the bracket M' and to a block or casting Q' extending outward from the bed of the machine, see Fig. 5.

A belt pulley R' is secured to the outer end of the saw-arbor F and an endless belt S' passes about said pulley, over a pulley T', a band-wheel U' and a pulley V'. Pulleys T' and V' are idlers. The band-wheel U' is mounted upon a shaft W', carried in boxes mounted upon the table or frame E. To one end of said shaft is secured a face plate or disk X' which coacts with a paper friction wheel Y' mounted upon the shaft O'. A weighted lever Z' is connected to the shaft W' and acts to move the same longitudinally through its bearings and thus urge the disk X' into contact with the face of the wheel Y'. By shifting said wheel toward or from the center of the driving disk X' the speed of the rolls may be varied. To effect such adjustment I provide the hub of the wheel Y' with a collar $A^2$ into which extends an arm of the slide $B^2$ mounted upon a shaft $C^2$, see Fig. 6. The slide $B^2$ is actuated by a hand-lever $D^2$ (Fig. 1) which extends to the forward portion of the machine and is connected by a suitable link $E^2$ and rod $F^2$ with the slide.

As will be readily appreciated, motion imparted to the wheel U' from the pulley R', through belt S', will be transmitted to the shaft W', thence through disk X' to the friction driving wheel Y', from said wheel to the shaft O', and thence to the endless belt K', which passes about the relatively large band-wheels I' and J' that serve to drive the lower feed rolls. The shaft $G^2$, (Fig. 4) upon which the pulley T' is mounted, may be adjusted so as to take up any slack in the belt S'.

The upper feed rolls are designated by $H^2$, $I^2$. The shaft which supports roll $H^2$ is carried in arms $J^2$, which in turn are splined or otherwise secured to a shaft $K^2$, said shaft finding its bearings in the frames B and D. An arm $L^2$ is secured to the shaft $K^2$ at substantially right angles to the arms $J^2$, said arm $L^2$ carrying at its upper end a pivoted block $M^2$ connected to the outer end of a piston-rod $N^2$.

Roller $I^2$ is mounted upon a shaft which is supported at the outer lower ends of arms $O^2$, which are splined or otherwise secured to a shaft $P^2$. A yoke or frame $Q^2$, is mounted upon shaft $P^2$ and a cylinder $R^2$ is swiveled in the upper end of said yoke, the piston of the cylinder being connected to the piston-rod $N^2$.

The steam-inlet for the cylinder is designated by $S^2$ (Figs. 1 and 2), the inlet of the steam being controlled by a valve mounted in a valve-casing $T^2$ from which leads the exhaust pipe $U^2$, the supply pipe $V^2$ passing to the cylinder, said pipe also acting, when the rolls $H^2$, $I^2$ are lowered, as an exhaust pipe, the steam supply at such time being cut off.

The valve is normally held in its closed position by a weighted lever $W^2$. In order that the valve may be readily opened by the operator, who stands at the front of the machine, the valve is provided with a rocker-arm $X^2$, to which is connected a link $Y^2$ that extends forward and is in turn connected to the swiveled frame or bail $Z^2$ which runs entirely across the front of the machine, so that no matter what may be the position of the operator he may readily grasp the bail and thus open the valve if occasion require, in order to raise the rolls.

Swivel connections $M^3$ and $N^3$, Fig. 2, are placed in the pipe connections so as to permit the cylinder and its supporting frame to swing.

To prevent one roll from dropping in advance of the other, owing to difference in their weight, I prefer to connect the rolls in such manner as to make them move in unison. To accomplish this I secure to the shafts $K^2$ and $P^2$ sectors $A^3$, $B^3$, which are in turn connected to each other by chains $C^3$, $D^3$, the chains being attached at the lower ends of the sectors and passing up against the face of the opposite sector, the upper ends of the chains being secured to the lower ends of rods $E^3$, each of said rods passing through a lug $F^3$ formed in the upper portion of a sector member. A spring $G^3$ encircles the upwardly-projecting end of each rod, and is held in place by a nut $H^3$, secured to the upper end of said rod. By this connection the shafts $K^2$ and $P^2$ are caused to rock in unison and as a consequence the rolls $H^2$, $I^2$ must of necessity move toward and from their companion positively-driven roll to the same extent. By the use of the springs $G^3$ a certain flexibility is, however, imparted to the roll system.

The springs will remain neutral unless two different thicknesses of lumber are passed into the machine, in which case they will yield to compensate for such difference. This is quite essential in case the timber being edged is not of uniform thickness, for it insures both the presser rolls $H^2$, $I^2$ passing over the uneven surface and, therefore, pressing down firmly on the stock, so that the same is fed through the edger in a perfectly straight line.

The steam passing from the pipe $V^2$ into the cylinder passes through two pipes $I^3$ and $J^3$. As it is exhausted from the cylinder it may pass freely through the pipe $I^3$, but a valve $K^3$ is located in the pipe $J^3$, said valve serving to hold the steam and water in the cylinder after the piston closes the mouth of the pipe $I^3$ and thus form a cushion for the piston.

The check-valve, as will be noted upon reference to Fig. 3, is provided with a small or restricted opening, so as to permit the water and steam to gradually pass out of the cylinder. The cushion thus formed will, however, prevent the rolls from dropping down and injuring the piston and cylinder.

As will be noted from the foregoing description, the steam cylinder is carried directly by an arm or yoke attached to one of the rock-shafts, by which construction I am enabled to use a relatively small cylinder and the rolls are substantially balanced. The arrangement is such that there is no dead center and the piston will act immediately upon the introduction of steam into the cylinder.

No claim is herein made to the mechanism for adjusting the feed rolls, as that forms the subject-matter of a divisional application filed on or about August 2, 1907, and patented January 28, 1908, No. 877,878.

Having thus described my invention, what I claim is:

1. In a gang-edger, the combination of a saw-arbor; a saw-supporting collar mounted thereon; a slide; an arm extending inwardly from the slide and engaging the saw-collar; a roller carried by the inner portion of the slide; a track secured to the frame of the machine in line with said roller; an arm extending downwardly from the slide; anti-friction rolls supported by said arm and movable upon tracks formed upon the frame of the machine said tracks and rolls interlocking; a second arm extending outwardly and laterally from said slide; and antifriction rolls carried by the outer end of said arm, said rolls moving upon tracks formed upon the frame of the machine the rolls and tracks interlocking, substantially as and for the purpose described.

2. In a gang-edger, the combination of a saw-arbor; a saw-supporting collar mounted thereon; a slide; an arm extending inwardly from the slide and engaging the saw-arbor; an arm extending downwardly from the slide; a pair of A-shaped rolls carried by said arm, said rolls working in suitable guides or ways formed in the frame; a second arm extending laterally from the slide, the outer end of the arm lying in a plane below that of the first-named arm; a pair of A-shaped rolls adjustably secured upon the end of said second arm; and guides or ways formed in the frame of the machine for receiving said rolls.

3. In a gang-edger, the combination of a saw-arbor; a saw-supporting collar mounted thereon; a slide; an arm extending inwardly from said slide and engaging the collar; a roller carried by the slide at the inner portion thereof; a track mounted upon the frame of the machine in line with the roller; a short arm extending downwardly from the outer portion of the slide; a pair of Λ-shaped rolls carried by said arm, the rolls having an interlocking connection with suitable ways or guides formed upon the frame of the machine; a second arm extending laterally and downwardly from the slide; and a pair of Λ-shaped rolls carried at the outer end of said arm, the rolls making interlocking connection with suitable ways or guides formed in the frame of the machine.

4. In a gang-edger, the combination of a saw-arbor; a saw-supporting collar mounted thereon; a slide; an arm extending inward from said slide and serving to shift the collar and its saw; a roller carried by the slide at the inner portion thereof; a track upon which said roller rests; an arm extending downwardly and inwardly from the slide; a pair of Λ-shaped rolls mounted upon an axle extending upward and inward from said arm, the rolls having an interlocking connection with ways or guides formed in the frame of the machine; a second arm secured to the slide, said arm extending downwardly and inwardly; a bracket secured to the lower end of said arm; a bolt mounted in said bracket so that it may be shifted laterally; and a pair of Λ-shaped rolls mounted upon the upper end of said bolt, the rolls making interlocking connection with grooves or ways formed in the frame of the machine.

5. In a gang-edger, the combination of a saw-arbor; a saw-supporting collar mounted thereon; a slide; an arm extending from the slide and serving to shift the collar and its saw; a roller mounted upon the inner portion of the slide; a track carried by the frame of the machine and upon which the roller rests; a cover or shield extending over said roller and serving to prevent the accumulation of dust and the like upon the track; an arm extending downwardly from the slide; and antifriction rolls carried by said arm, the rolls bearing upon ways or channels formed in the frame of the machine, the frame overlying the rolls and serving to exclude dust or the like therefrom.

6. In a gang-edger, the combination of a saw-arbor; a saw-supporting collar mounted upon the arbor; a slide; an arm connected to the slide and engaging the collar; a locking bar; a locking lever fulcrumed upon the slide and adapted to engage the locking bar; and antifriction rolls carried by the slide, the axes of said rolls being disposed at an angle of substantially 45° to the horizontal, thereby preventing tipping or tilting of the slide as the lever is moved to lock or unlock the slide from the locking bar.

7. In a gang-edger, the combination of a saw-arbor; a saw-supporting collar mounted thereon; a slide; an arm carried by the slide and engaging said collar; an overhanging bracket mounted upon the frame of the machine; antifriction rolls carried by the slide, the axes of said rolls standing in a plane substantially 45° to the horizontal; and tracks or ways formed in the under face of said bracket for the reception of said rolls, substantially as and for the purpose described.

8. In a gang-edger, the combination of a saw-arbor; a saw-supporting collar mounted thereon; a slide; an arm extending inwardly from the slide and engaging the saw-collar; means for locking the slide in its adjusted position; tracks carried by the frame of the machine, said tracks being disposed opposite each other in pairs; a stub-axle extending upwardly from a downwardly-projecting portion of the slide, said axle extending inwardly between the tracks; and a roller mounted upon the axle and forming an interlocking connection with the oppositely-disposed tracks, whereby tipping or tilting of the slide will be prevented.

9. In a gang-edger, the combination of a frame or bed; a saw-arbor; a saw-supporting collar mounted thereon; a slide; an arm extending inwardly from the slide and engaging the saw-collar; means for locking the slide in its adjusted position upon the frame; two pairs of oppositely-disposed tracks formed in the bed beneath overhanging portions thereof; a stub-axle extending upwardly from the slide into the space between the uppermost pair of tracks; a roller mounted upon the axle and forming an interlocking connection with the tracks and an arm extending outwardly at substantially right angles to the slide; a stub-axle carried by the outer end of said arm, extending inwardly between the lowermost pair of tracks; and a roller mounted upon the stub-axle and forming an interlocking connection with said tracks.

In testimony whereof I have signed my name to this specification in the presence of two subscribing witnesses.

ULRICH ANDERSON.

Witnesses:
WILLIAM McDUMOTT,
L. P. DAUTERMAN.